(12) United States Patent
Ramachandran et al.

(10) Patent No.: US 11,568,278 B2
(45) Date of Patent: Jan. 31, 2023

(54) USING UNSUPERVISED MACHINE LEARNING TO PRODUCE INTERPRETABLE ROUTING RULES

(71) Applicants: Atlassian Pty Ltd, Sydney (AU); Atlassian, Inc., San Francisco, CA (US)

(72) Inventors: Mukund Ramachandran, Sunnyvale, CA (US); Rameil Sarkis, San Jose, CA (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 310 days.

(21) Appl. No.: 16/885,831

(22) Filed: May 28, 2020

(65) Prior Publication Data

US 2020/0380380 A1 Dec. 3, 2020

Related U.S. Application Data

(60) Provisional application No. 62/856,705, filed on Jun. 3, 2019.

(51) Int. Cl.
*G06F 17/00* (2019.01)
*G06N 5/02* (2006.01)
(Continued)

(52) U.S. Cl.
CPC ........... *G06N 5/025* (2013.01); *G06K 9/6223* (2013.01); *G06K 9/6256* (2013.01);
(Continued)

(58) Field of Classification Search
CPC ........ G06N 5/025; G06N 20/00; G06N 5/003; G06K 9/6223; G06K 9/6256; G06K 9/6282
(Continued)

(56) References Cited

U.S. PATENT DOCUMENTS

2020/0167690 A1* 5/2020 Zhao ...................... G06K 9/628

* cited by examiner

Primary Examiner — Isaac M Woo
(74) Attorney, Agent, or Firm — Brownstein Hyatt Farber Schreck, LLP

(57) ABSTRACT

Embodiments of the disclosure relate to systems and methods for leveraging unsupervised machine learning to produce interpretable routing rules. In various embodiments, a training dataset comprising a plurality of data records is created. The plurality of data records includes message data comprising a plurality of messages and action data comprising a plurality of actions that correspond to the plurality of messages. A first machine learning model is trained using the training dataset. The first machine learning model as trained provides cluster data that indicates, for each data record of the plurality of data records of the training dataset, membership in a cluster of a plurality of clusters. An enhanced training dataset is created that comprises the message data from the training dataset, the action data from the training dataset, and the cluster data. A set of second machine learning models is trained using the enhanced training dataset, each respective second machine learning model of the set of second machine learning models providing a decision tree of a plurality of decision trees and corresponding to a distinct cluster of the plurality of clusters. Rules can be extracted from each decision tree of the plurality of decision trees and used as a basis for creating and transmitting alerts based on incoming messages.

20 Claims, 5 Drawing Sheets

(51) Int. Cl.
*G06K 9/62* (2022.01)
*G06N 20/00* (2019.01)
*G06N 5/00* (2006.01)

(52) U.S. Cl.
CPC ........... *G06K 9/6282* (2013.01); *G06N 5/003* (2013.01); *G06N 20/00* (2019.01)

(58) Field of Classification Search
USPC .................................... 707/600–899; 706/47
See application file for complete search history.

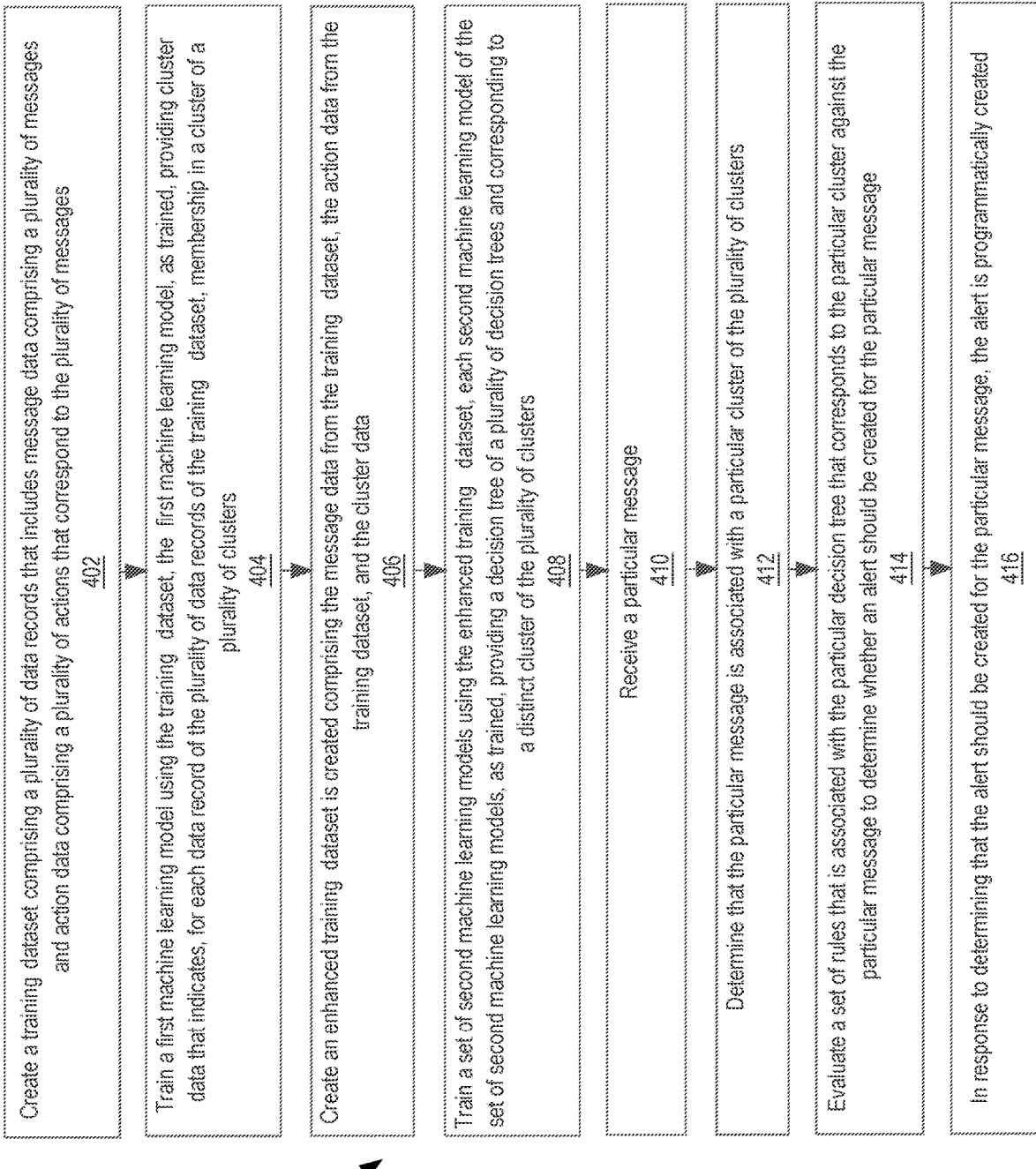

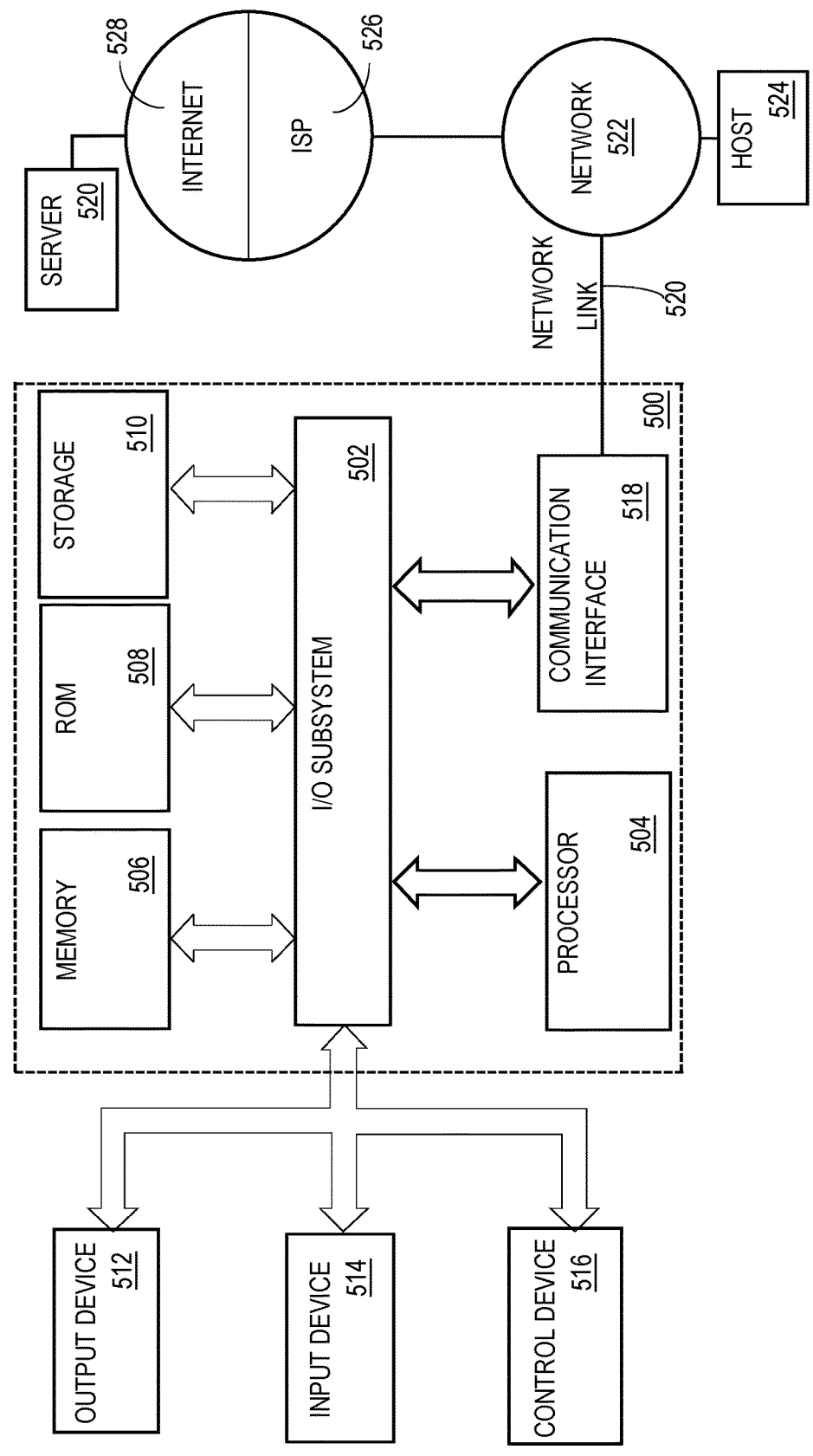

USING UNSUPERVISED MACHINE LEARNING TO PRODUCE INTERPRETABLE ROUTING RULES

BENEFIT CLAIM

This application claims the benefit under 35 U.S.C. § 119(e) of provisional application 62/856,705, filed Jun. 3, 2019, the entire contents of which are hereby incorporated by reference for all purposes as if fully set forth herein.

FIELD OF THE DISCLOSURE

One technical field of the present disclosure is computer-implemented incident management systems. Yet another technical field is computer-implemented supervised and unsupervised machine learning algorithms.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A majority of decisions made by incident management systems include the creation and maintenance of alert triggers, escalation policies, notification conditions, and incident creation policies. In present practice, each of these rule-based policies is individually tailored to the corresponding services and systems such as networks, SQL servers, or VPNs. The creation and maintenance of these policies typically require manually setting hand-tuned sets of rules and conditions based on domain knowledge, internal service level agreements, and historical analysis of a per service/system basis, which is time-consuming and subject to error.

Additionally, these policies may have multiple conditions which may require complex set of "and"/"or" triggers in addition to specific thresholds. These conditions not only require interpreting the log output from a system such as "cannot connect to SQL server" or "outage" but also require assessing the type of action that is required to be executed by the incident management system in response to certain types of messages. With a high number of complex rules and conditions per service and multiple internal and external services throughout an organization, creating and maintaining these rules is expensive in terms of time and computing resources and it is not possible for manual, human work to respond in real time to changing data that may warrant deploying substantially different policies.

Techniques are desired to automate the creation and modification of rules and policies for incident management systems, including providing real time response to dynamically changing data where possible.

SUMMARY

The appended claims may serve as a summary of the invention.

BRIEF DESCRIPTION OF THE DRAWINGS

FIG. 4 illustrates a flow chart of an example flow diagram of an example process, according to an embodiment.

FIG. 5 illustrates an example computer system, according to an embodiment.

DESCRIPTION OF EXAMPLE EMBODIMENTS

Figure 1:
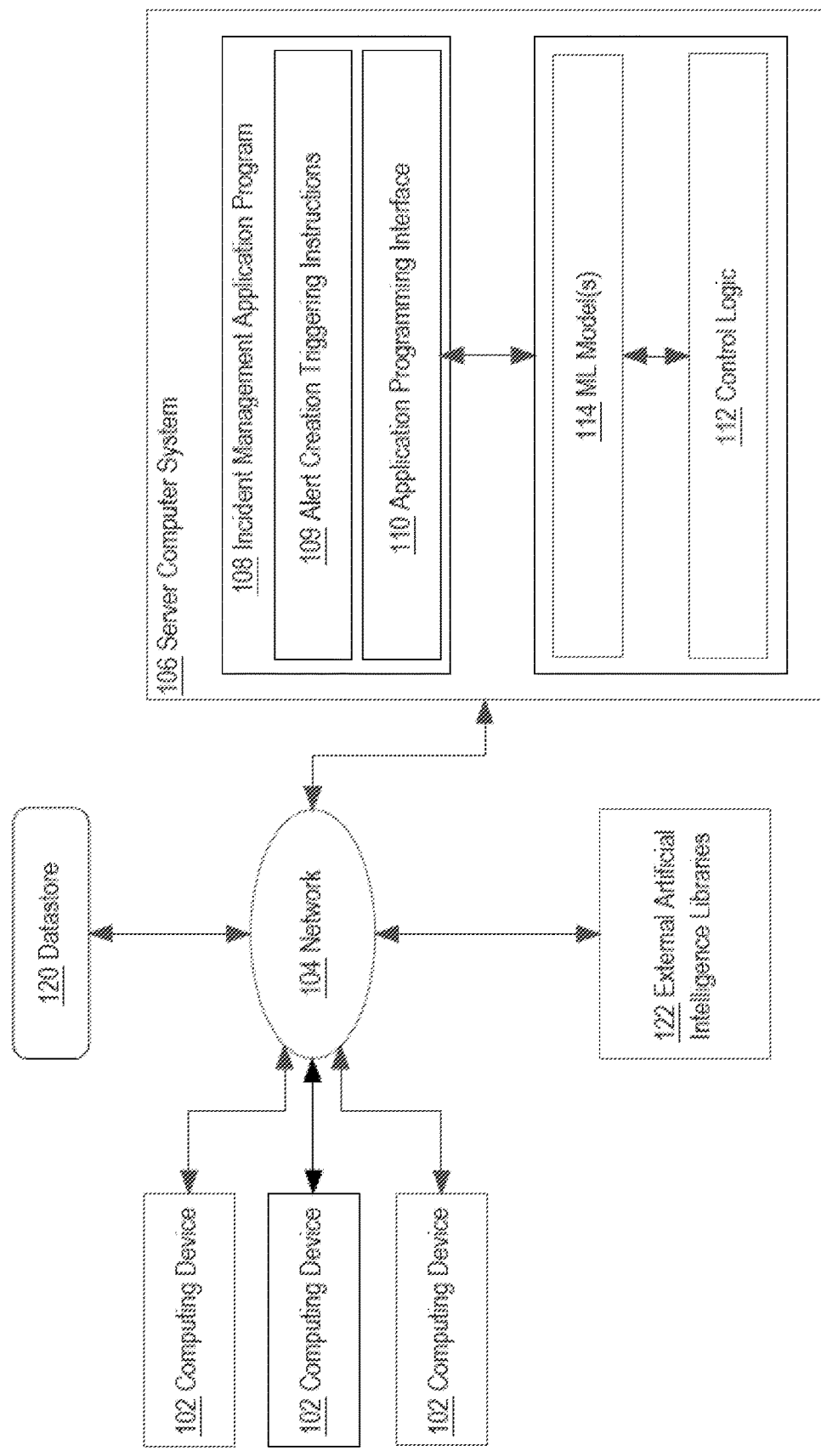
FIG. 1 illustrates an example computer system, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention. Embodiments are described in sections according to the following outline:

1. OVERVIEW
2. EXAMPLE SYSTEM IMPLEMENTATION
3. EXAMPLE FUNCTIONAL IMPLEMENTATION
4. IMPLEMENTATION EXAMPLE—HARDWARE OVERVIEW
5. OTHER ASPECTS OF DISCLOSURE

1. OVERVIEW

Techniques are provided for automatically creating and maintaining rules that can trigger the automatic creation and transmission of alerts in an incident management system. A first step of a particular embodiment is the creation of a training dataset that includes message data and corresponding action data for each message in the message data. The training dataset can be used to train an unsupervised machine learning model that provides cluster data that indicates membership in a cluster for each data record in the training dataset. A second step of the particular process is enhancing the training dataset with the cluster data, and then training a separate supervised machine learning model for each distinct cluster of data records from the enhanced training dataset. The result of the second step is a plurality of trained supervised machine learning models where each trained supervised machine learning model is specialized for a distinct cluster of data records. Additionally, each of the plurality of trained supervised machine learning models provides a decision tree from which highly specialized rules can be extracted. When a message is received from a client device, the message can be analyzed to determine which cluster the message corresponds to and which corresponding trained supervised machine learning model will provide the best set of rules to apply against the message as a basis for creating alerts.

This two-tiered training process provides the benefit of capturing more nuanced relationships that hold better for different data patterns in a dataset. For example, a single decision tree model trained on the entire enhanced training dataset may produce highly accurate predictions globally, but components of the single decision tree model such as certain branches of the global decision tree may produce inaccurate predictions. By training a separate supervised machine learning model for each distinct cluster of data records from the enhanced training dataset, each trained model becomes highly specialized for data from the respective cluster.

Additionally, by using the two-tiered training process, localized cluster decision tree models created for specific clusters of data in a dataset can be manually or automatically tuned to improve performance and accuracy for specific clusters of data by adjusting thresholds which only affect a segment of the entire dataset. Furthermore, informational data can be derived from localized cluster decision tree models to identify performance metrics of each model and differences in alert trigger data produced by each model. Thus, localized cluster decision tree models provide more control, intuition, and explainability for an administrator who desires to optimize the automatic creation of highly accurate and effective rules for an incident management system.

2. EXAMPLE SYSTEM IMPLEMENTATION

FIG. 1 illustrates a computer system that may be used to implement an embodiment of an incident management system. FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of how to create routing rules that are capable of machine interpretation and that overcome the technical issues set forth in the Background. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In the example of FIG. 1, a plurality of computing devices 102 are coupled via network 104 to a server computer system 106. Any number of computing devices 102 may be used and three (3) are shown in FIG. 1 merely for purposes of providing an illustrative example. Each computing device 102 may comprise a mobile computing device, desktop computer, laptop computer, or server computer. Each computing device 102 is capable of receiving input via a keyboard, pointing device or other input-output device, has a visual data display device, and one or more network interfaces that are capable of communication with network 104. In one embodiment, each computing device 102 executes at least an operating system and a web browser application program that is capable of receiving, rendering and causing display of pages based upon structured markup language code or instructions in HTML, XML or similar languages. In one embodiment, each computing device 102 executes at least an application monitoring program that is capable of receiving log data from applications via network 104. In one embodiment, each computing device 102 executes at least an application that is capable of transmitting log data via network 104.

The network 104 broadly represents any combination of one or more local area networks, wide area networks, campus networks and/or internetworks. Packet-switched networks may be used with networking infrastructure devices such as switches and routers that are programmed to communicate packet data based on internet protocol (IP), a transport protocol such as TCP or UDP, and higher-order protocols at any of several different logical layers, such as those defined by the Open Systems Interconnect (OSI) multi-layer internetworking model.

Server computer system 106 may comprise one or more cores, processors, computers, and/or virtual machine instances hosted on the premises of an enterprise or using a public or private cloud computing facility.

In an embodiment, server computer system 106 hosts or executes an incident management application program 108, which is illustrated as a single functional element in FIG. 1 but may be organized using a plurality of different computer programs, processes or other software elements. The incident management application program 108 is a computer-executed system that may be arranged to receive, monitor, manage, compare, and execute actions based on the operations of one or more programs executing on one or more computing devices 102. The incident management application program 108 is programmed or configured to generate alerts, notifications, incidents, and escalations based on defined rules and/or logic. The incident management application program 108 may be further programmed or configured to transmit alerts and notifications to electronic addresses, e.g. email, to different user accounts associated with incident management application program 108 and receive updates from user accounts regarding the transmitted alerts and notifications.

An incident management system (IMS) such as incident management application program 108 manages the creation and tracking of alerts in a variety of contexts. At a high level, an alert comprises an indication of an event that occurred in an external system, application, or service that is monitored by an IMS, monitored by a program associated or integrated with an IMS, or directly associated with an IMS. An IMS may store digital alert data in datastore 120 that represents alerts. In one form, an alert as represented in the IMS comprises a plurality of data fields that are representative of the content of an alert.

Alert data may be received automatically via programmatic interfaces. Additionally, or alternatively, some of the information required for alert data fields is received from computing device 102 or a user account when entering an alert into the system. An IMS extracts relevant data from the information provided by a user account or computing device 102 and stores such data in appropriate data fields of an alert item. Alternatively, an alert can be created automatically by the system in response to receiving message data and based on alert trigger data, as further discussed herein. The alert creation triggering instructions 109 are programmed to create alerts based on alert trigger data. Alert trigger data specifies the conditions to when an alert will be created. That is, alert trigger data comprises conditions or rules that must be satisfied by received message data for an alert to be created by the alert creation triggering instructions 109.

The actual data fields of an alert vary depending on the requirements of a given IMS implementation. In the present disclosure, an alert may contain one or more of the following data fields: a message field that stores message data that indicates the basis of the alert creation, a teams field that includes the names of the teams that were added to the alert to be notified, a recipients field that includes the names of the recipients that were added to the alert to be notified, an entity field that is used to specify the domain that the alert is related to, such as name of the server or application, a description field that is used to keep a long description related with the alert, and an extra properties field that is used to keep additional key-value pairs related with the alert.

An alert may be created with additional data fields, such as: a status field that contains the information of alert state, a recipient states field that shows the last state of the recipient users according to the alert, a notes field that shows the notes that were added initially or later by users, and an activity log field that provides any user or system activity related to an alert along with their update times on this section with the time sequence. Alert creation, user interactions including actions, notifying or skipping to notify a user, de-duplication events are some of the example activities. A user may be required to manually enter some of the data field information mentioned above, and/or an IMS client or server may automatically populate some data field information for the request.

The incident management application program 108 is programmed or configured to process functions for the creation and management of a plurality of different user accounts, consisting of a set of user credentials that may be used to access the system using one of the computing devices 102. Each user account comprises a record in a datastore 120 that associates a unique handle, identifier or name; a screen name or display name; credentials such as an e-mail address and password; and other metadata relating to an account. Handles or account identifiers may be denoted by a character tag such as "@" and the use of a handle in a content item implies that the corresponding account is being addressed. An example of a handle is @jameskirk with a corresponding screen name or display name of "James Kirk."

The incident management application program 108 is programmed to receive message data from computing devices 102 using an application programming interface 110 (API). For example, incident management application program 108 may receive message data including infrastructure log data from a monitoring application executing on computing device 102. The infrastructure log data may include information about an underlying system that is being monitored. The message data may include messages such as HTTP responses, including successful HTTP responses with codes 200-206, redirection HTTP response with codes 300-308, and error HTTP responses with response codes 500-511. The message data may include system level or code level data including any log information, latency information, network information, or system specific error messages. Received message data may or may not be structured. Received message data may be stored in a table in datastore 120 as strings.

In one embodiment, incident management application program 108 is the OPSGENIE cloud-based incident management tool, commercially available from Atlassian Pty Ltd., Sydney, Australia.

In an embodiment, the incident management application program 108 is communicatively coupled using application programming interface 110 to computing devices 102 to receive log data or user request data depending on whether computing device 102 comprises a monitoring application that transmits data to application programming interface 110 or a user application that sends commands and controls application functionality of the incident management application program 108.

Incident management application program 108 may be configured to integrate with external applications to receive and transmit data. Incident management application program 108 may include API based integrations facilitated by the application programming interface 110 to receive message data from external monitoring applications or services hosted by computing devices 102. Received message data may be stored in datastore 120 and/or be processed by alert creation triggering instructions 109 to create alerts.

In an embodiment, the incident management application program 108 includes alert creation triggering instructions 109 which are programmed to create alerts based on alert trigger data. Alert trigger data specifies the rules or conditions to when an alert will be created. That is, alert trigger data comprises conditions or rules that must be satisfied by received message data for an alert to be created by the alert creation triggering instructions 109. The alert creation triggering instructions 109 may also determine the format of an alert such as what fields an alert is composed of and any actions associated with the alert such as notifying relevant users via email of an alert creation.

Incident management application program 108 is also communicatively coupled using application programming interface 110 to ML models 114 and/or control logic 112 to receive information such as alert trigger data comprising rules. Other embodiments may use different internal organizational arrangements to implement functionally equivalent computer operations.

The control logic 112 is further coupled to external artificial intelligence libraries 122. In an embodiment, to external artificial intelligence libraries 122 implement neural network functions, classifier functions, natural learning processing, or other machine learning functions and may be imported, statically or dynamically linked, called or programmatically integrated into or coupled to the ML model 114 using other means. In an embodiment, to external artificial intelligence libraries 122 comprise the TensorFlow system, which is publicly available under open-source licensing.

Using a computer system architecture of this arrangement, the incident management application program 108 may support the creation of alerts based on comparing and/or matching alert trigger data to received message data in real time with creation of alerts occurring as fast as message data is received and thus at a level of responsiveness that is beyond the capability of manual or human work. As discussed above, in an embodiment, when message data is received by the incident management application program 108, the message data is stored in datastore 120. After the message data is evaluated by the alert creation triggering instructions 109, the message data may be stored in datastore 120 and supplemented with event or action data that specifies whether an action (e.g. creation of an alert) was taken in response to the incident management application program 108 receiving the message data.

3. EXAMPLE FUNCTIONAL IMPLEMENTATION

FIG. 4 shows an example flowchart of a method for leveraging unsupervised machine learning to produce interpretable routing rules.

Although the steps in FIG. 4 are shown in one example order, the steps of FIG. 4 may be performed in any order and are not limited to the order shown in FIG. 4. Additionally, some steps may be optional, may be performed multiple times, or may be performed by different components. All steps, operations, and functions of a flow diagram that are described herein are intended to indicate operations that are performed using programming in a special-purpose computer or general-purpose computer, in various embodiments. Each flow diagram and block diagram is presented at the same level of detail that persons skilled in the applicable technical fields use to communicate with one another about plans, specifications, algorithms, and data structures as a basis for programming implementations to solve the applicable technical problems, while also applying their accumulated knowledge and skill of computer architecture, programming, and engineering techniques. Each flow diagram in this disclosure provides a guide, plan, or specification of an algorithm for programming a computer to execute the functions that are described.

In step 402, a training dataset is created. The training dataset comprises a plurality of data records that includes message data comprising a plurality of messages and action data comprising a plurality of actions that correspond to the plurality of messages. For example, data stored in datastore 120 may be processed by the server computer system 106 to create a training dataset.

TABLE 1

Example Training Dataset

| Message | Timestamp | Integration | Priority | Tag | Recipients | Action |
|---|---|---|---|---|---|---|
| Can't connect to VPN | Fri, 10 May 2019 00:30:4 | JIRA | 2 | Issue tracking | admin@atlassian.com | 0 |
| SQL server latency low | Sun, 4 May 2019 01:22:1 | Azure HealthService | 1 | Cloud, Storage | admin@atlassian.com | 1 |
| Network authentication required | Sat, 11 May 2019 10:40:2 | Amazon CloudWatch | 1 | Cloud, Compute | admin@atlassian.com | 1 |

TABLE 1 illustrates an example training dataset which can be used to train machine learning models. TABLE 1 includes multiple data records, each data record including a plurality of attributes. For example, TABLE 1 includes columns (i.e. attributes) including 'Message', 'Timestamp', 'Integration', 'Priority', 'Tag', 'Recipients', and 'Action'. The 'Message' column corresponds to message data received by the incident management application program 108. Although TABLE 1 depicts the 'Message' column including high level string data describing a received message, the 'Message' column may include any level of information such as low level, unstructured infrastructure log data. The 'Action' column corresponds to action data representing an action taken by the by the incident management application program 108 as a result of receiving a particular message. For example, a '0' value may indicate that an alert was not created in response to receiving the corresponding message data, where a '1' value may indicate that an alert was created in response to receiving the corresponding message data. In some embodiments, data from the 'Message' column may be treated as an input or feature for training various machine learning models. In some embodiments, data from the 'Action' column may be treated as a target or output for training various machine learning models. The training dataset may include additional data such as timestamp data, integration data, message metadata, entity data, team data, priority data, tag data, recipient data, etc.

In step 404, a first machine learning model is trained using the training dataset. The first machine learning model, as trained, provides cluster data that indicates, for each data record of the plurality of data records of the training dataset, membership in a cluster of a plurality of clusters. For example, control logic 112 may obtain a copy of the training dataset stored in datastore 120, and use the training dataset to train one of ML model(s) 114. In one embodiment, training one of ML model(s) 114 may comprise using the training dataset to train an unsupervised model. The unsupervised model may comprise a segmentation or clustering model. Once the unsupervised model is trained, the trained model produces output that indicates a cluster or group membership for each data record included in the training dataset. In one embodiment, the cluster membership may indicate a specific application or service that the message is associated with. In another embodiment, the output may also include metadata for each cluster such as how many members per cluster, false positives, and other metrics for each cluster. The output cluster membership for each message is appended to each message as a supplemental datapoint to create an enhanced training dataset, as discussed in step 406.

In an embodiment, an algorithm used to train the first machine learning model comprises any unsupervised clustering algorithm such as K-Means, Mean Shift, or Agglomerative Hierarchical Clustering.

In an embodiment, the first machine learning model is trained using default hyperparameters.

In step 406, an enhanced training dataset is created. The enhanced training dataset comprises the message data from the training dataset, the action data from the training dataset, and the cluster data.

TABLE 2

Example Enhanced Training Dataset

| Message | Timestamp | Integration | Priority | Tag | Recipients | Action | Cluster |
|---|---|---|---|---|---|---|---|
| Can't connect to VPN | Fri, 10 May 2019 00:30:4 | JIRA | 2 | Issue tracking | admin@atlassian.com | 0 | 1 |
| SQL server latency low | Sun, 4 May 2019 01:22:1 | Azure HealthService | 1 | Cloud, Storage | admin@atlassian.com | 1 | 2 |

TABLE 2-continued

Example Enhanced Training Dataset

| Message | Timestamp | Integration | Priority | Tag | Recipients | Action | Cluster |
|---|---|---|---|---|---|---|---|
| Network authentication required | Sat, 11 May 2019 10:40:2 | Amazon CloudWatch | 1 | Cloud, Compute | admin@atlassian.com | 1 | 4 |

TABLE 2 illustrates an example enhanced training dataset which can be used to train machine learning models. TABLE 2 is similar to TABLE 1 but includes the attribute "Cluster" which indicates cluster membership of the message or row. TABLE 2 depicts cluster membership encoded in a single column, however, other embodiments may encode cluster membership in a binary format, e.g. one column per cluster. In some embodiments, data from the 'Message' column may be treated as an input or feature for training various machine learning models. In some embodiments, data from the 'Action' column may be treated as a target or output for training various machine learning models.

In step 408, a set of second machine learning models is trained using the enhanced training dataset. Each second machine learning model of the set of second machine learning models, as trained, provides a decision tree of a plurality of decision trees and corresponds to a distinct cluster of the plurality of clusters. For example, the control logic 112 may obtain a copy of the enhanced training dataset stored in datastore 120 and use it to train one of ML model(s) 114. Training one of ML model(s) 114 may comprise using the enhanced training dataset to train a supervised model. In one embodiment, the supervised model may comprise a decision tree classification model.

In an embodiment, an algorithm used to train set of second machine learning models comprises a gradient boosting (GBM) algorithm or random forest (RF) algorithm. The GBM or RF algorithm used to train the first machine learning model is used to fit or generate decision trees by regressing or classifying the targets from the training dataset with the features from the training dataset. Technical details and examples of GBM are taught in the related reference "Gradient Boosting Classifier," at https://scikit-learn.org/stable/modules/generated/sklearn.ensemble.GradientBoostingClassifier.html.

In an embodiment, the set of second machine learning models is trained using default hyperparameters.

In one embodiment, a decision tree is a machine learning technique that utilizes a set of decision nodes. The decision nodes are arranged into a plurality of layers in a tree, or flow chart, structure. A root node is connected to a plurality of child nodes in a hierarchical structure, with each decision node branching into two or more child nodes, and ending at a plurality of leaf nodes. Each decision node receives input data and tests a particular attribute of the input data. The decision node may generate and/or store output corresponding to the outcome of the test. Additionally, if the decision node is not a leaf node, a decision is made as to which child node of the decision node to branch to based on the outcome of the test.

Figure 2:
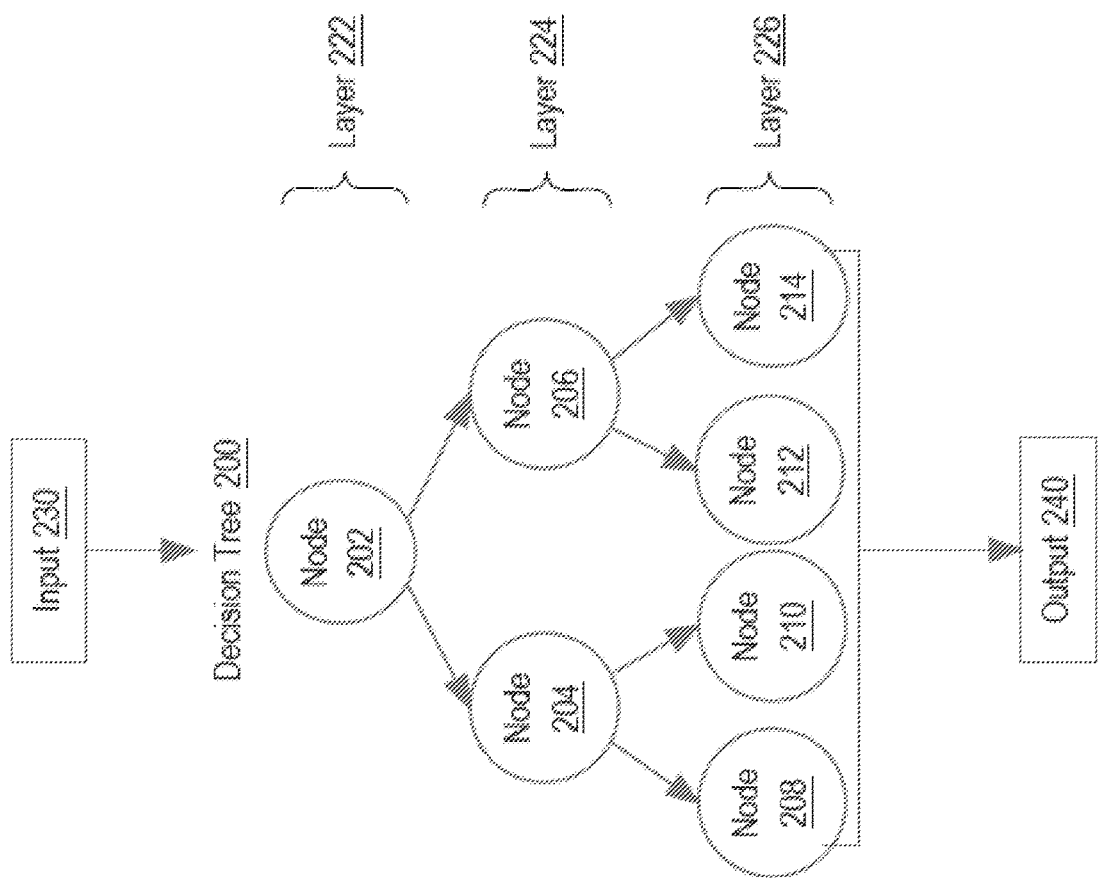
FIG. 2 illustrates an example decision tree, according to an embodiment.

FIG. 2 illustrates an example decision tree. In the illustrated example, decision tree 200 comprises seven nodes, node 202-214, arranged in three layers, layer 222, layer 224, and layer 226. Each of nodes 202-214 may be configured to test a particular attribute, feature, or value of input data received at the node, and generate output data corresponding to the outcome of the test. The output data may comprise rules. Each rule is composed of a set of categorical indicators or a threshold on a numerical value. Additionally, non-leaf nodes such as nodes 202-206 may branch to a node in the subsequent layer based on the outcome of the test. In other embodiments, more or fewer layers may be used, and the number of nodes and/or branches at each layer may differ based on the embodiment.

In FIG. 2, node 202 receives input 230. In an embodiment, input 230 comprises a plurality of input values. For example, input 230 may be a vector, array, database table such as TABLE 1 and/or TABLE 2 as discussed above, or other multi-dimensional object. Node 202 may be configured to test a particular attribute, feature, or value of the plurality of input values. Based on the outcome of the test, one of child nodes 204 and 206 is selected as the next node to traverse, and input 230 is provided to the selected node. Additionally, output may be generated corresponding to node 202.

For the purpose of illustrating a clear example, assume input 230 comprises three values corresponding to three features: x, y, and z. Node 202 may be configured to determine whether the value of "x" is greater than or less than 3. If "x" is less than 3, then node 202 may branch to node 204, and if "x" is greater than or equal to 3, then node 202 may branch to node 206. Each of node 204 and 206 may branch based on different tests and/or different attributes, features, or values. For example, node 204 may branch to either node 208 or node 210 based on whether the value of "y" is greater than or less than 5, and node 206 may branch to either node 212 or node 214 based on whether the value of "y" is greater than or less than 10.

After reaching a leaf node, such as nodes 208-214, output of the decision tree is generated based on the decision nodes that were traversed or selected. In an embodiment, the output of the decision tree comprises the set of output generated by the selected decision nodes. In other embodiments, the output of the decision tree is generated based on the output of the selected decision nodes. For example, the output may be generated by determining a majority-vote of the output of the traversed decision nodes or by averaging the output of the traversed decision nodes.

As an example, assume decision tree 200 is trained to determine a yes or no categorization based on input 230. Each of nodes 202-214 may generate output indicating a respective yes or no determination. The output 240 of the decision tree 200 may be based on whether more selected nodes generated a yes determination versus a no determination. Alternately, each node may generate an output of 0 corresponding to a no determination and output of 1 corresponding to a yes determination. The output 240 of the decision tree 200 may be an average of the output generated by selected decision nodes and indicate a percentage likelihood of a yes categorization. For example, assume node 202 generated an output of 0, node 204 generated an output of 1, and node 210 generated an output of 0. The output 240 of the decision tree 200 may be the average of the three output values, or 0.33.

In some embodiments, to train the set of second machine learning models, the enhanced training dataset may be partitioned into a plurality of localized training datasets where each localized training dataset represents membership in a distinct cluster of the plurality of clusters. For example, a first localized training dataset will only include data records that are members of cluster '1', and a second localized training dataset will only include data records that are members of cluster '2'. A second machine learning models of the set of second machine learning models may be trained for each localized training dataset. Thus a second machine learning model of the set of second machine learning models is trained for each cluster.

By training the set of second machine learning models using the enhanced training dataset, such as by training localized decision tree classification models using localized training datasets, decision trees are generated for each cluster of the enhanced training dataset. Each decision tree provides a representation of alert trigger data which specifies rules or conditions that, when satisfied, trigger the creation of an alert by the incident management application program 108.

Localized decision tree models provide the functionality to capture more nuanced relationships that hold better for certain patterns in a dataset. For example, a single decision tree model trained on the entire enhanced training dataset may produce highly accurate predictions globally, but components of the single decision tree model such as certain branches of the global decision tree may produce inaccurate predictions.

By using localized cluster decision tree models, models created for specific patterns of data in a dataset associated with each cluster can be manually or automatically tuned to improve performance and accuracy by adjusting thresholds which only affect a segment of the entire dataset. Informational data can be derived from localized cluster decision tree models to identify performance metrics of each model and differences in alert trigger data produced by each model. Thus, localized cluster decision tree models provide more control, intuition, and explainability for an end administrator. The functional steps described above may occur at wire speed or real time as fast as message data is received.

In step 410, a particular message is received. For example, incident management application program 108 may receive a particular messages comprising infrastructure log data from a monitoring application executing on computing device 102. The infrastructure log data may include information about an underlying system that is being monitored. The particular message may include HTTP responses, including successful HTTP responses with codes 200-206, redirection HTTP response with codes 300-308, and error HTTP responses with response codes 500-511. The particular message may include system level or code level data including any log information, latency information, network information, or system specific error messages.

In step 412, it is determined that the particular message is associated with a particular cluster of the plurality of clusters. The particular cluster corresponds to a particular second machine learning model of the set of second machine learning models that provides a particular decision tree of the plurality of decision trees. In one embodiment, the determination may be made by comparing the particular message to the enhanced training dataset that indicates what messages correspond to different clusters. For example, as shown in TABLE 2, the message "SQL server latency low" corresponds to Cluster 2. Any other method or technique may be used to determine which cluster the particular message is associated with.

In step 414, a set of rules that is associated with the particular decision tree that corresponds to the particular cluster is evaluated against the particular message to determine whether an alert should be created for the particular message. For example, the particular cluster corresponds to a particular second machine learning model of the set of second machine learning models that provides a particular decision tree of the plurality of decision trees. In one embodiment, the set of rules is extracted from the particular decision tree that corresponds to the particular cluster. The set of rules may be extracted from the particular decision tree using any applicable computerized technique such as by running a script or program to record the rules encoded in one or more data structures that represent the decision tree.

Figure 3:
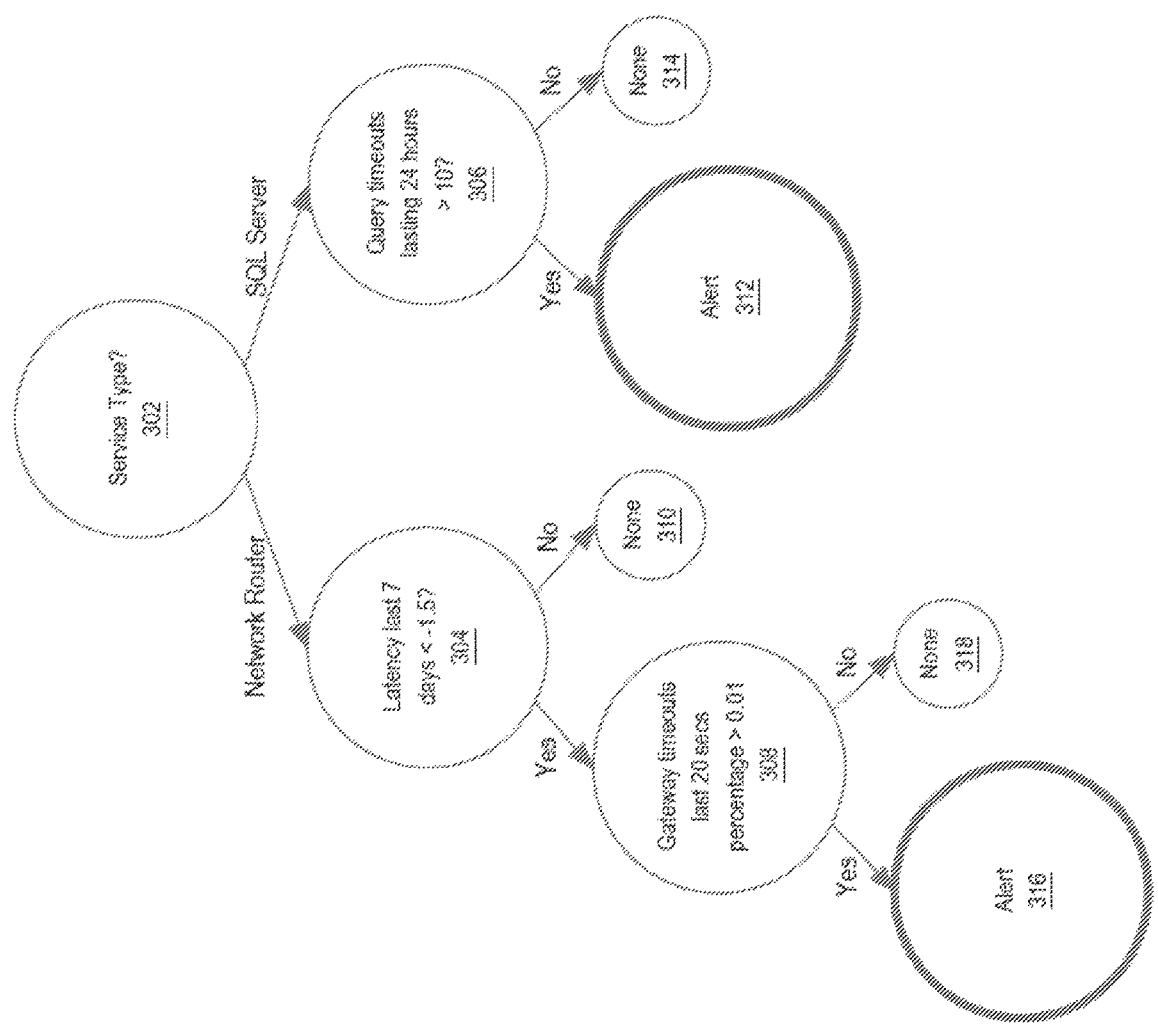
FIG. 3 illustrates a trained decision tree that specifies rules or conditions that trigger the creation of an alert, according to an embodiment.

FIG. 3 illustrates a trained decision tree that specifies rules or conditions that trigger the creation of an alert. For example, node 302 is configured to determine whether the service type of a received message is a 'Network Router' or 'SQL Server'. If the service type of the received message is a 'Network Router', then node 302 may branch to node 304, and if the service type of the received message is a 'SQL Server', then node 302 may branch to node 306.

Node 304 is configured to determine whether the latency in the last 7 days is less than −1.5. If the latency in the last 7 days is less than −1.5, then node 304 may branch to node 308, and if the latency in the last 7 days is equal to or greater than −1.5, then node 304 may branch to node 310.

Node 306 is configured to determine whether the amount of query timeouts lasting 24 hours is greater than 10. If the amount of query timeouts lasting 24 hours is greater than 10, then node 306 may branch to node 312, and if the amount of query timeouts lasting 24 hours is less than or equal to 10, then node 306 may branch to node 314.

Node 308 is configured to determine whether the percentage of time that gateway timeouts last 20 seconds is greater than 0.01. If the percentage of time that gateway timeouts last more than 20 seconds is greater than 0.01, then node 308 may branch to node 316, and if the percentage of time that gateway timeouts last 20 seconds is less than or equal to 0.01, then node 308 may branch to node 318.

Nodes 310, 312, 314, 316, and 318 are leaf nodes that indicate an output as a result of the decision nodes that were traversed to reach the respective node. In this example, nodes 310, 314, and 318 have an output of 'None'. 'None' indicates that no action was taken or should be taken as a result of the particular decision path. Nodes 312 and 317 have an output of 'Alert'. 'Alert' indicates that an alert was created or should be created as a result of the particular decision path.

Sets of rules may be extracted from each decision tree using any applicable computerized technique such as by running a script or program to record the rules encoded in one or more data structures that represent the decision tree. Rules and conditions specified by each node may be utilized by the incident management application program 108 as alert trigger data to trigger the creation of alerts.

In an embodiment, to train a decision tree, the information gain is calculated for each feature of a plurality of features of a set of training input data, based on corresponding training output data. Information gain is a change in information entropy between one state and another. Information gain for a particular feature is the reduction in entropy from introducing a condition relating to the feature. As an example, assume entropy is calculated for a first feature, X.

Assume the condition "Y<3" is introduced, for a second feature, Y. Information gain for a feature, Y, is calculated by subtracting the entropy for X given Y from the entropy of X.

An example equation for calculating entropy of X may be:

$$H(X)=p(X)\log p(X)$$

An example equation for calculating the information gain from introducing the condition "Y<3" may be:

$$IG(X;Y<3)=H(X)-H(X|Y<3)$$

where H(X) is the entropy of X, H(X|Y<3) is the entropy of X conditioned on Y being a value less than 3. This may also be referred to as the mutual information between X and the condition.

Additionally, the information gain may be expressed as a percentage based on the initial entropy of X. The percentage may be referred to as the relative mutual information between X and the condition. An example equation for calculating relative mutual information may be:

$$RMI(X;Y<3)=IG(X;Y<3)/H(X)$$

In an embodiment, training a decision tree comprises calculating the information gain associated with each feature of a plurality of features of the input data, and determining the feature with the highest information gain. The feature of the input data with the highest information gain is selected as a root node. The root node branches based on the selected feature.

Additionally, calculating the information gain may comprise identifying a plurality of conditions for splitting the input data based on each feature of the plurality of features, and identifying the condition associated with the highest information gain. The condition may be a particular value, or a particular range of values, for the feature, depending on the data type associated with the feature. For example, if a feature is associated with numeric data, the condition may be a range. If a feature is associated with string data, the condition may be whether the string includes a particular string value.

The input data is divided based on the branches of the root node. For each branch, the information gain is calculated for each of the remaining features based on the portion of the divided input data corresponding to the branch. The feature of the input data with the highest information gain is selected as the decision node for the branch. For example, assume the root node branches based on the condition "Y<3". The input data is divided into two subsets: a first subset where the value of feature Y is less than 3, and a second subset where the value of feature Y is greater than or equal to 3. A decision node is generated based on the first subset, and a second decision node is generated based on the second subset.

The process of dividing the input data into subsets and generating a decision node corresponding to each subset is repeated for each branch of each decision node, until no features remain, or the information gain of all remaining features is 0.

Additionally, or alternatively, rather than generating decision nodes by following the generated branches and dividing the input data, each decision node may be trained independently from other decision nodes in the tree. In an embodiment, each decision node is generated based on a subset of features of the input data. Additionally, or alternatively, each decision node may be generated based on a subset of the input data. Selecting the subset of features and/or the subset of input data may be performed for each decision node, and the set of features and/or the subset of input data may be different for each decision node. Additionally, the subset of features and/or the subset of input data may be selected randomly for each decision node. For each decision node, the information gain is calculated for each feature of the input data with the highest information gain is selected as the feature for that decision node.

In an embodiment, a number of decision nodes for the decision tree may be determined and the steps described above are performed a number of times based on the determined number of decision nodes. For example, for decision tree 200, since it comprises three levels and each node branches in two, decision tree 200 comprises seven decision nodes. The steps of selecting a subset of features and/or input data, calculating information gain, and determining a feature corresponding to the highest information gain are performed seven times to generate the seven decision nodes. After the decision nodes are generated, the decision nodes may be connected based on their location in the decision tree.

In step 416, in response to determining that the alert should be created for the particular message, the alert is programmatically created. In an embodiment, an alert comprises an indication of an event that occurred in an external system, application, or service that is monitored by an IMS, monitored by a program associated or integrated with an IMS, or directly associated with an IMS. An IMS may store digital alert data in datastore 120 that represents alerts. In one embodiment, an alert comprises a plurality of data fields that are representative of the content of an alert. In response to creating the alert, the alert is transmitted to an electronic address such as an email address or user account associated with an incident management application program.

4. IMPLEMENTATION EXAMPLE—HARDWARE OVERVIEW

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, inter-network or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DBaaS provider manages or controls the underlying cloud infrastructure, applications, and servers, including one or more database servers.

5. OTHER ASPECTS OF DISCLOSURE

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various operations have been described using flowcharts. In certain cases, the functionality/processing of a given flowchart step may be performed in different ways to that described and/or by different systems or system modules. Furthermore, in some cases a given operation depicted by a flowchart may be divided into multiple operations and/or multiple flowchart operations may be combined into a single operation. Furthermore, in certain cases the order of operations as depicted in a flowchart and described may be able to be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method comprising:
creating a training dataset comprising a plurality of data records, the plurality of data records including message data comprising a plurality of messages and action data comprising a plurality of actions that correspond to the plurality of messages;
training a first machine learning model using the training dataset, the first machine learning model as trained providing cluster data that indicates, for each data record of the plurality of data records of the training dataset, membership in a cluster of a plurality of clusters;
creating an enhanced training dataset comprising the message data from the training dataset, the action data from the training dataset, and the cluster data; and
training a set of second machine learning models using the enhanced training dataset, each respective second machine learning model of the set of second machine learning models providing a decision tree of a plurality of decision trees;
wherein:
the decision tree corresponds with a particular cluster of the plurality of clusters; and
the decision tree comprises a set of rules corresponding to the particular cluster of the plurality of clusters, the set of rules describing an action to be performed in response to receiving a message having a particular message data.

2. The method of claim 1, wherein the plurality of data records includes at least one of timestamp data, integration data, tag data, and recipient data.

3. The method of claim 1, wherein:
based on the particular message data of the received message, a particular cluster of the plurality of clusters is associated with the received message; and
the action includes programmatically generating an alert in response to the received message.

4. The method of claim 3, wherein:
the set of rules are extracted from the particular decision tree, the set of rules including one or more rules that are optimized to determine whether the alert should be generated.

5. The method of claim 3, wherein the received message comprises an HTTP response.

6. The method of claim 1, further comprising:
partitioning the enhanced training dataset into a plurality of localized training datasets, each localized training dataset of the plurality of localized training datasets representing membership in a distinct cluster of the plurality of clusters;
wherein training the set of second machine learning models using the enhanced training dataset comprises training each second machine learning model of the set of second machine learning models using a distinct localized training dataset of the plurality of localized training datasets.

7. The method of claim 1, wherein the first machine learning model comprises an unsupervised machine learning model.

8. The method of claim 1, wherein each second machine learning model of the set of second machine learning models comprises a decision tree classification model.

9. The method of claim 1, wherein the first machine learning model is trained using a K-Means algorithm, a Mean Shift algorithm, or Agglomerative Hierarchical Clustering algorithm.

10. The method of claim 1, wherein the set of second machine learning models is trained using a gradient boosting algorithm or a random forest algorithm.

11. A computer system comprising:
one or more processors;
one or more memories storing instructions which, when executed by the one or more processors, cause:
creating a training dataset comprising a plurality of data records, the plurality of data records including message data comprising a plurality of messages and action data comprising a plurality of actions that correspond to the plurality of messages;
training a first machine learning model using the training dataset, the first machine learning model as trained providing cluster data that indicates, for each data record of the plurality of data records of the training dataset, membership in a cluster of a plurality of clusters;
creating an enhanced training dataset comprising the message data from the training dataset, the action data from the training dataset, and the cluster data; and
training a set of second machine learning models using the enhanced training dataset, each respective second machine learning model of the set of second machine learning models providing a decision tree of a plurality of decision trees;
wherein:
the decision tree corresponds with a particular cluster of the plurality of clusters; and
the decision tree comprising a set of rules corresponding to the particular cluster of the plurality of clusters, the set of rules describing an action to be performed in response to receiving a message having a particular message data.

12. The system of claim 11, wherein the plurality of data records includes at least one of timestamp data, integration data, tag data, and recipient data.

13. The system of claim 11, wherein:
in accordance with the particular message data of the received message, a particular cluster of the plurality of clusters is associated with the received message; and
the action includes programmatically generating an alert in response to the received message.

14. The system of claim 13, wherein:
the set of rules are extracted from the particular decision tree, the set of rules including one or more rules that are optimized to determine whether the alert should be generated.

15. The system of claim 13, wherein the received message comprises an HTTP response.

16. The system of claim 11, further comprising:
partitioning the enhanced training dataset into a plurality of localized training datasets, each localized training dataset of the plurality of localized training datasets representing membership in a distinct cluster of the plurality of clusters;

wherein training the set of second machine learning models using the enhanced training dataset comprises training each second machine learning model of the set of second machine learning models using a distinct localized training dataset of the plurality of localized training datasets.

17. The system of claim 11, wherein the first machine learning model comprises an unsupervised machine learning model.

18. The system of claim 11, wherein each second machine learning model of the set of second machine learning models comprises a decision tree classification model.

19. The system of claim 11, wherein the first machine learning model is trained using a K-Means algorithm, a Mean Shift algorithm, or Agglomerative Hierarchical Clustering algorithm.

20. The system of claim 11, wherein the set of second machine learning models is trained using a gradient boosting algorithm or a random forest algorithm.

* * * * *